US009147231B2

(12) United States Patent
Tomioka

(10) Patent No.: US 9,147,231 B2
(45) Date of Patent: Sep. 29, 2015

(54) RESOLUTION DETERMINATION DEVICE, IMAGE PROCESSING DEVICE, AND IMAGE DISPLAY APPARATUS

(71) Applicant: PANASONIC CORPORATION, Osaka (JP)

(72) Inventor: Shinichi Tomioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/277,387

(22) Filed: May 14, 2014

(65) Prior Publication Data

US 2014/0247995 A1   Sep. 4, 2014

Related U.S. Application Data

(63) Continuation of application No. PCT/JP2012/003172, filed on May 15, 2012.

(30) Foreign Application Priority Data

Nov. 21, 2011   (JP) .................................. 2011-254215

(51) Int. Cl.
*G06K 9/48* (2006.01)
*G06T 5/00* (2006.01)
*H04N 5/14* (2006.01)
*G06T 7/00* (2006.01)

(52) U.S. Cl.
CPC ............... *G06T 5/002* (2013.01); *G06T 7/0085* (2013.01); *H04N 5/142* (2013.01); *G06T 2207/20024* (2013.01); *G06T 2207/20192* (2013.01); *G09G 2340/0407* (2013.01)

(58) Field of Classification Search
CPC ....... G06T 5/002; G06T 7/0085; H04N 5/142

USPC .................................................. 382/199, 194
See application file for complete search history.

(56) References Cited

U.S. PATENT DOCUMENTS

2006/0132649 A1\* 6/2006 Miyazawa .................... 348/458
2006/0274204 A1  12/2006 Kimura et al.
(Continued)

FOREIGN PATENT DOCUMENTS

JP   2009-015025 A   1/2009
JP   2009-044417 A   2/2009

OTHER PUBLICATIONS

International Search Report issued in PCT/JP2012/003172, dated Aug. 21, 2012, with English translation.

*Primary Examiner* — Ruiping Li
(74) *Attorney, Agent, or Firm* — McDermott Will & Emery LLP

(57) ABSTRACT

A resolution determination section of a resolution determination device includes an edge intensity calculation section that calculates an edge intensity for each of a plurality of pixels in an input image based on the difference between the luminance of the pixel and the luminance of a pixel adjoining the pixel, a coring processing section that brings the edge intensity near to value 0 when the edge intensity is determined to be noise, an edge change point detection section that detects a pixel at which the adjoining edge intensities are different in sign, a first accumulation section that accumulates the detection results for a plurality of pixels, and a second accumulation section that accumulates pixels of which the accumulation value exceeds a parameter value input from outside for one frame. The section determines whether or not the input image is an up-converted image based on the accumulation result.

9 Claims, 5 Drawing Sheets

(56) References Cited

U.S. PATENT DOCUMENTS

| | | |
|---|---|---|
| 2007/0268400 A1 | 11/2007 | Kondo et al. |
| 2009/0009660 A1* | 1/2009 | Kageyama et al. ............ 348/452 |
| 2009/0041349 A1* | 2/2009 | Suzuki et al. ................. 382/168 |

* cited by examiner

○ ◎ ○
$Y_{N-1}$ $Y_N$ $Y_{N+1}$

RESOLUTION DETERMINATION DEVICE, IMAGE PROCESSING DEVICE, AND IMAGE DISPLAY APPARATUS

CROSS-REFERENCE TO RELATED APPLICATIONS

This is a continuation of International Application No. PCT/JP2012/003172 filed on May 15, 2012, which claims priority to Japanese Patent Application No. 2011-254215 filed on Nov. 21, 2011. The entire disclosures of these applications are incorporated by reference herein.

BACKGROUND

The present disclosure relates to a technology for enhancing the resolution of images.

In recent years, it has become increasingly popular for image display apparatuses such as TV receivers to display high definition (HD) images. In digital broadcasting, for example, HD image signals are transmitted in many cases. HD images sometimes include an image obtained by up-converting a conventionally-used standard definition (SD) image so as to have the same number of pixels as that of an HD image. As a technology for enhancing the resolution of such an image, Japanese Unexamined Patent Publication No. 2009-015025 (Patent Document 1), for example, describes a technique of enhancing the resolution of an up-converted image using a plurality of image frames.

SUMMARY

When an apparatus itself up-converts an image, the resolution of the original image is known. Therefore, processing for enhancing the resolution of the up-converted image can be performed appropriately.

When the apparatus receives an up-converted image, however, there arises a problem that information on the resolution of its original image is not received. Also, in Patent Document 1, while the resolution of an up-converted image is enhanced, a plurality of image frames must be used to perform this processing.

It is an objective of the present disclosure to determine whether or not the input image is an image obtained by up-converting an image comparatively low in resolution, like an SD image, based on a one-frame image.

According to an aspect of the present disclosure, a resolution determination device includes: an edge intensity calculation section configured to calculate an edge intensity for each of a plurality of pixels included in an input image based on a difference between the luminance of the pixel and the luminance of a pixel adjoining the pixel; and a resolution determination section, wherein the resolution determination section includes a coring processing section configured to bring the edge intensity near to value 0 when the edge intensity is determined to be noise, an edge change point detection section configured to detect a pixel at which the adjoining edge intensities are different in sign, a first accumulation section configured to accumulate results of the edge change point detection section for a plurality of pixels, and a second accumulation section configured to accumulate pixels of which the accumulation value exceeds a parameter value input from outside the resolution determination section for one frame, and the resolution determination section determines whether or not the input image is an image obtained by up-converting an image having a resolution equal to or less than a predetermined value, and whether or not the input value is a flat image, based on the accumulation result, and outputs the determination result.

According to another aspect of the disclosure, an image processing device includes: the resolution determination device described above; and a resolution enhancement processing section configured to perform resolution enhancement processing for the input image according to the determination result from the resolution determination section and output the result.

According to yet another aspect of the disclosure, an image display apparatus includes: the image processing device described above; and a display device configured to display an image subjected to the resolution enhancement processing by the image processing device.

Thus, according to the present disclosure, whether or not the input image is an image obtained by up-converting an image having a resolution equal to or less than a predetermined value, and whether or not the input image is a flat image, can be found by one-frame image. Therefore, appropriate resolution enhancement processing can be performed according to the resolution of the original image and the type of the image at high speed and low cost. In particular, the quality of an image obtained by up-converting an image comparatively low in resolution, like an SD image, and a flat image can be enhanced.

As described above, according to the present disclosure, since whether or not the input image is an image obtained by up-converting an image having a resolution equal to or less than a predetermined value, and whether or not the input image is a flat image, can be found by one-frame image, the quality of an image obtained by up-converting an image comparatively low in resolution, like an SD image, and a flat image can be enhanced at high speed and low cost.

BRIEF DESCRIPTION OF THE DRAWINGS

FIG. 7A shows an example of the effect for an image high in resolution and FIG. 7B shows an example of the effect for an image low in resolution.

DETAILED DESCRIPTION

An embodiment of the present disclosure will be described hereinafter with reference to the relevant drawings.

Figure 1:
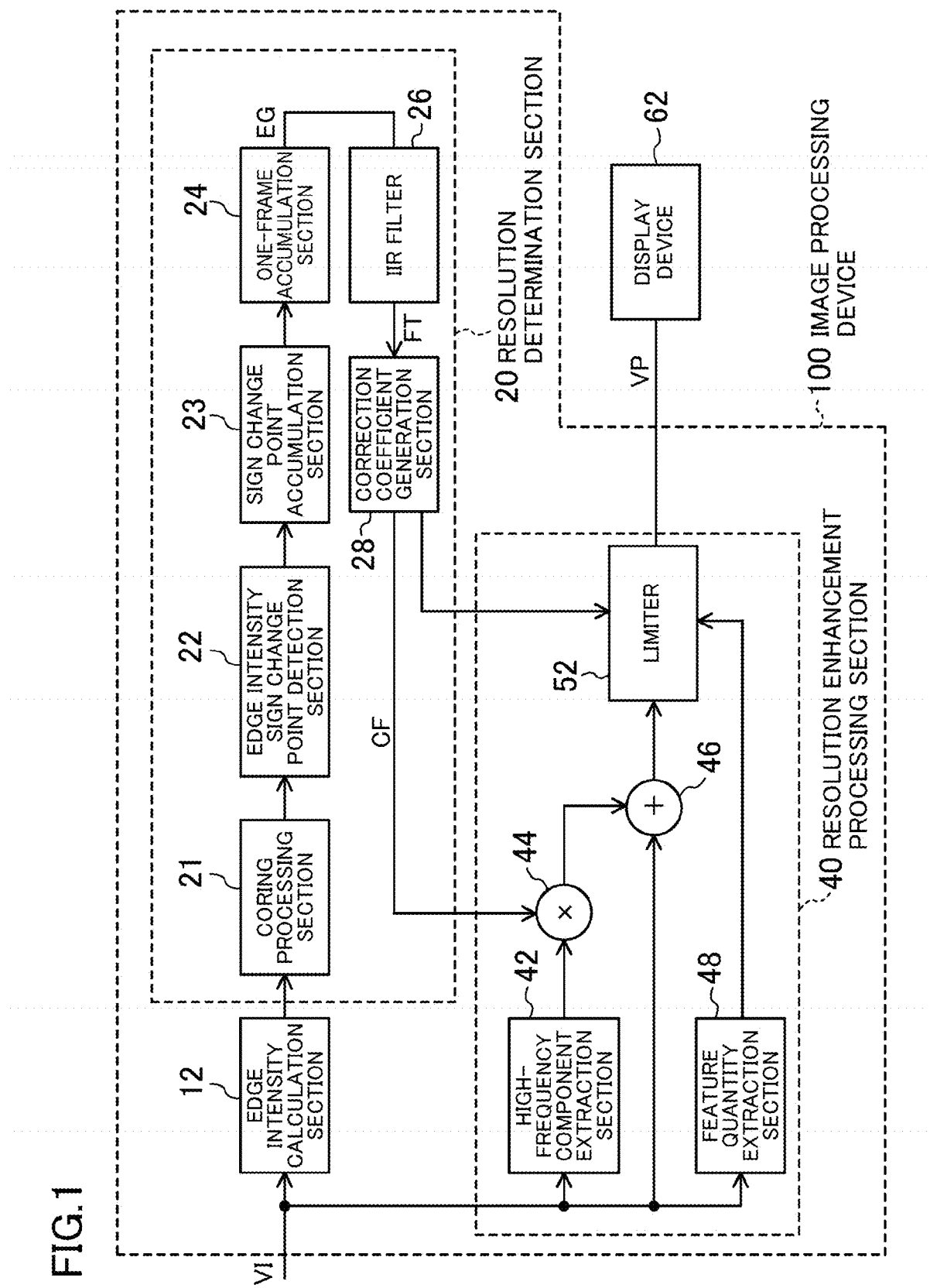
FIG. 1 is a block diagram showing an example configuration of an image display apparatus of an embodiment of the present disclosure.

FIG. 1 is a block diagram showing an example configuration of an image display apparatus of an embodiment of the present disclosure.

The image display apparatus of FIG. 1 includes an image processing device 100 and a display device 62. The image processing device 100 includes an edge intensity calculation section 12, a resolution determination section 20, and a resolution enhancement processing section 40. The edge intensity calculation section 12 and the resolution determination section 20 operate as a resolution determination device.

The resolution determination section 20 has a coring processing section 21, an edge intensity sign change point detection section 22, a sign change point accumulation section 23, a one-frame accumulation section 24, an infinite impulse response (IIR) filter 26, and a correction coefficient generation section 28. The resolution enhancement processing section 40 has a high-frequency component extraction section 42, a multiplier 44, an adder 46, a feature quantity extraction section 48, and a limiter 52.

An input image VI into the image processing device 100 is an SD image or an HD image (e.g., 1080 p: a progressive image having 1080 effective scanning lines. Note however that the input image VI may be an original HD image or an HD image obtained by up-converting an original SD image (e.g., 480 p). The up-conversion refers to converting an image comparatively low in resolution (e.g., an SD image) to have the same number of pixels as an image larger in the number of pixels (e.g., an HD image).

Figures 2, 3:
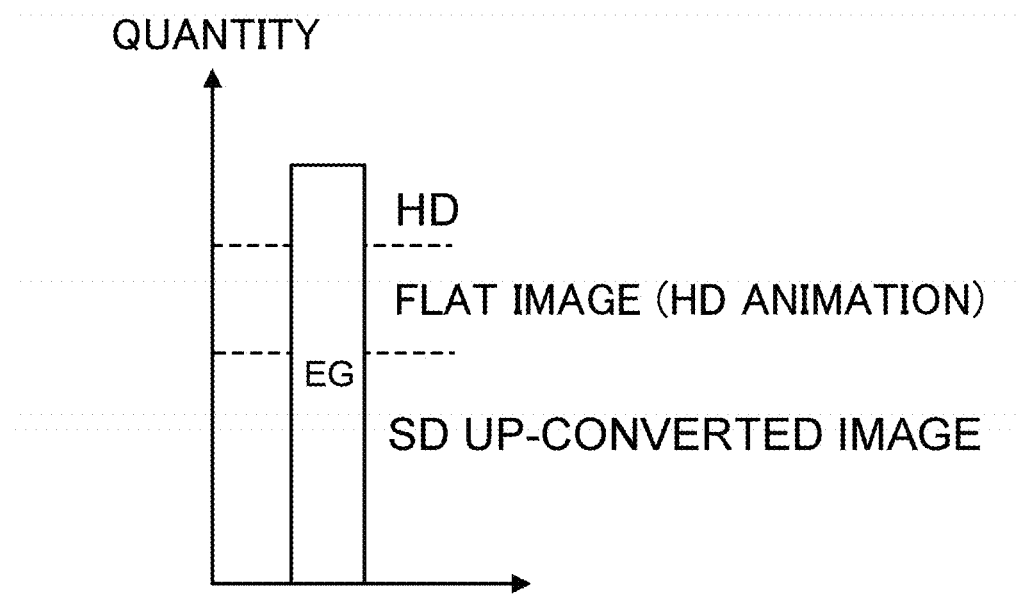
FIG. 2 is an explanatory view showing an example of arrangement of pixels in an input image.
FIG. 3 is a view showing an edge change point accumulation value in an input image VI.

FIG. 2 is an explanatory view showing an example of arrangement of pixels in the input image VI. The edge intensity calculation section 12 calculates the edge intensity based on the difference between the luminance of a pixel at a given position in the input image VI and the luminance of a pixel adjoining the above pixel. The coring processing section 21 brings an edge intensity determined to be noise near to value 0 based on a parameter input from outside.

The edge intensity sign change point detection section (edge change point detection section) 22, receiving the output of the coring processing section 21, detects a pixel satisfying the condition that the difference between the luminance YN of the pixel at a given position and the luminance YN+1 of a pixel adjoining the pixel on the right is different in sign from the difference between the luminance YN of the pixel at the given position and the luminance YN−1 of a pixel adjoining the pixel on the left.

The sign change point accumulation section (first accumulation section) 23 accumulates such pixels different in sign for a plurality of pixels arranged from side to side, to detect pixels exceeding a threshold input from outside.

The one-frame accumulation section (second accumulation section) 24 accumulates such pixels for one frame, to determine a frequency value EG.

The resolution determination section 20 determines whether or not the input image VI is an image obtained by up-converting an image having a resolution equal to or less than a predetermined value, and whether or not the input image VI is a flat image, based on the frequency value EG, and outputs the determination result.

As an example, the case that the resolution determination section 20 determines whether or not the input image VI is an image obtained by up-converting an image having a resolution equal to or lower than that of an SD image and whether or not the input image VI is a flat image will be described hereinafter. The flat image refers to an animation image, for example.

As shown in FIG. 3, the frequency value EG is different among an image (HD) that is originally an HD image, an image (SD) obtained by up-converting an original SD image, and a flat image.

In the resolution determination section 20, the IIR filter 26 smoothes the frequency value EG in the time axis direction, and outputs a smoothed count value FT to the correction coefficient generation section 28. An input S1(n) and an output S2(n) of the IIR filter 26 have the relationship $$S2(n)=\alpha S1(n)+(1-\alpha)S2(n-1)$$

where $\alpha$ is a real coefficient, n is a natural number, and (n) indicates that the signal in question is the signal for the n-th pixel. In place of the IIR filter 26, another filter that smoothes the input value in the time axis direction may be used.

Figure 4A:
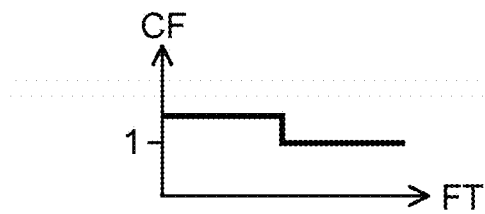
FIG. 4A is a view showing an example of the relationship between the input value and the output value of a correction coefficient generation section in FIG. 1.

FIG. 4A is a graph showing an example of the relationship between an input value FT and an output value CF in the correction coefficient generation section 28 in FIG. 1. The correction coefficient generation section 28 generates a correction coefficient CF in response to the count value FT according to the relationship in FIG. 4A, for example, and outputs the resultant value to the multiplier 44 as the determination result. In this case, when the correction coefficient CF is larger than 1, this indicates that the input image VI has been determined to be an image obtained by up-converting an image having a resolution equal to or lower than that of an SD image, and when the correction coefficient CF is equal to or less than 1, this indicates that the the input image VI has been determined to be an image based on an image having a resolution higher than that of an SD image.

Figure 4B:
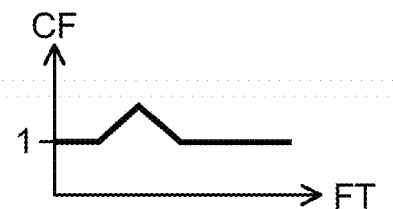
FIG. 4B is a view showing another example of the relationship between the input value and the output value.

FIG. 4B is a graph showing another example of the relationship between the input value FT and the output value CF. The correction coefficient generation section 28 may use the relationship in the graph of FIG. 4B in place of the graph of FIG. 4A.

The resolution enhancement processing section 40 performs resolution enhancement processing for the input image VI according to the correction coefficient CF and outputs a processed image VP to the display device 62. The resolution enhancement processing is edge emphasis processing, for example, which is performed as follows.

Figure 5A:
FIG. 5A is a view showing an example of the luminance at an edge in the input image VI.
Figure 5B:
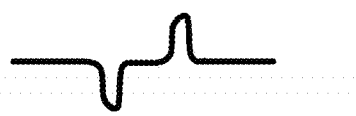
FIG. 5B is a view showing the luminance, corresponding to FIG. 5A, in the output of a high-frequency component extraction section in FIG. 1.
Figure 5C:
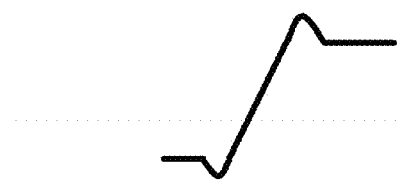
FIG. 5C is a view showing the luminance, corresponding to FIG. 5A, in the output of an adder in FIG. 1.
Figure 5D:
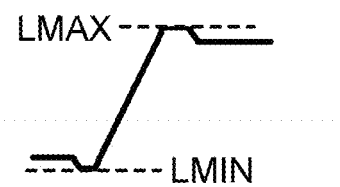
FIG. 5D is a view showing the luminance, corresponding to FIG. 5A, in the output of a limiter in FIG. 1.

FIG. 5A is a view showing an example of the luminance at an edge in the input image VI. In FIGS. 5A to 5D, the x-axis represents the position of a pixel, and the y-axis represents the luminance. FIG. 5B is a view showing the luminance, corresponding to FIG. 5A, in the output of the high-frequency component extraction section 42 in FIG. 1, FIG. 5C is a view showing the luminance, corresponding to FIG. 5A, in the output of the adder 46 in FIG. 1, and FIG. 5D is a view showing the luminance, corresponding to FIG. 5A, in the output of the limiter 52 in FIG. 1.

The high-frequency component extraction section 42 extracts a high-frequency component from the input image VI and outputs the result. The high-frequency component extraction section 42 outputs (YN−1+2YN−YN+1)/2 for a pixel having a luminance YN, for example. The luminance in the output of the high-frequency component extraction section 42 is as shown in FIG. 5B. The multiplier 44 multiplies the output of the high-frequency component extraction section 42 by the correction coefficient CF, and outputs the result to the adder 46. The adder 46 adds the output of the multiplier 44 to the input image VI and outputs the result. The luminance in the output of the adder 46 is as shown in FIG. 5C.

Figure 6A:
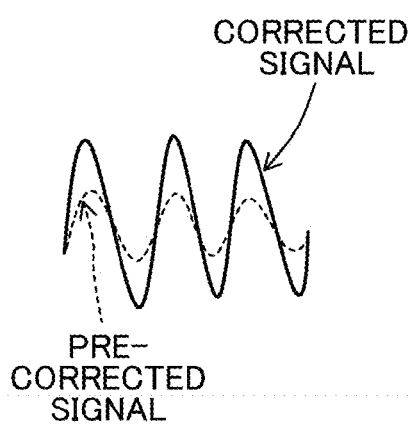
FIG. 6A is a view showing an example of correction of a video signal of an image other than a flat image.
Figure 6B:
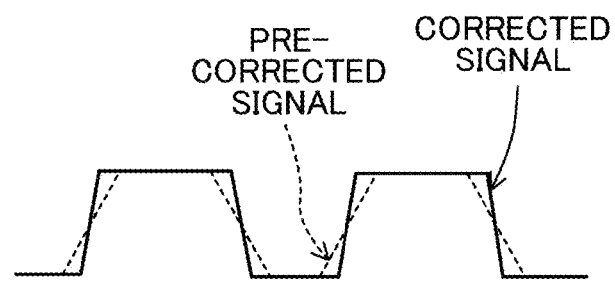
FIG. 6B is a view showing an example of correction of a video signal of a flat image.

The feature quantity extraction section 48 determines the feature quantity for the pixel having the luminance YN and outputs the result. The feature quantity extraction section 48 determines, as the feature quantity, the maximum luminance LMAX and the minimum luminance LMIN out of the luminance values of the pixel having the luminance YN and eight pixels surrounding this pixel, for example. The limiter 52 limits the luminance of the image obtained by the resolution enhancement processing described above to a value within the range determined based on the input image VI, and outputs the result. More specifically, the limiter 52 limits any portion of the output of the adder 46 exceeding the maximum luminance LMAX to the maximum luminance LMAX and limits any portion thereof falling below the minimum luminance LMIN to the minimum luminance LMIN, and outputs the result. The image VP subjected to the resolution enhancement processing output from the limiter 52 is as shown in FIG. 5D. The limitation of the range by the maximum luminance LMAX and the minimum luminance LMIN is performed for flat images, but not performed for the other images. FIG. 6A shows an example of the correction result of an image other than a flat image, and FIG. 6B shows an example of the correction result of a flat image. For an image other than a flat image, the appearance of fineness is improved by giving overshoots/undershoots, not performing limitation as shown in FIG. 5D. For a flat image, the appearance of sharpness is improved by performing the limitation, not giving overshoots/undershoots.

Figure 7B:
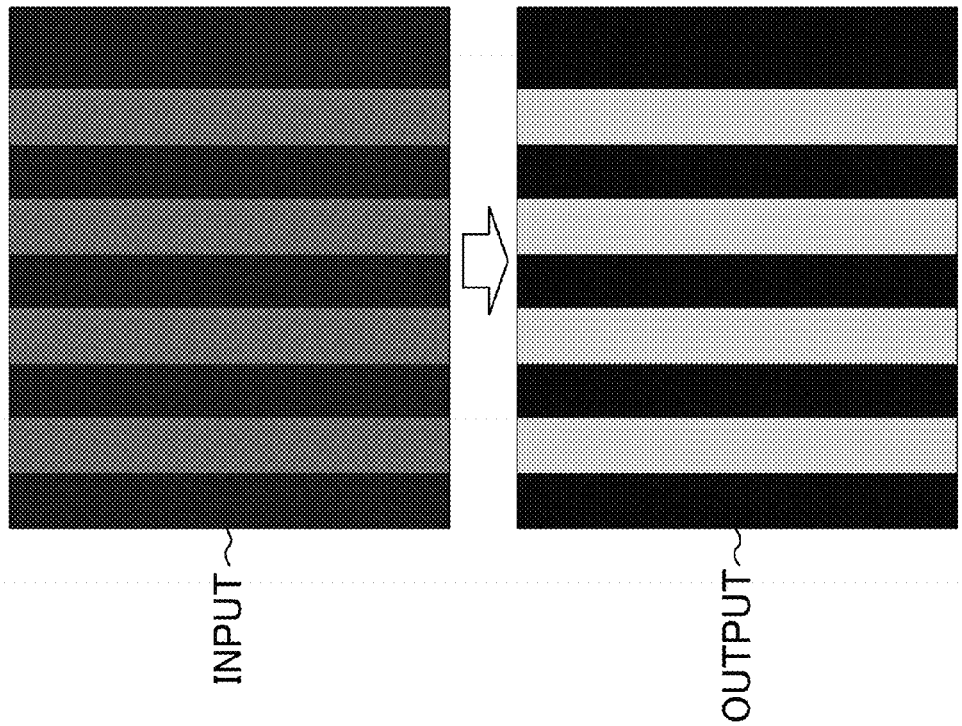
FIGS. 7A and 7B show examples of the effect of the embodiment of the disclosure, where
Figure 7A:
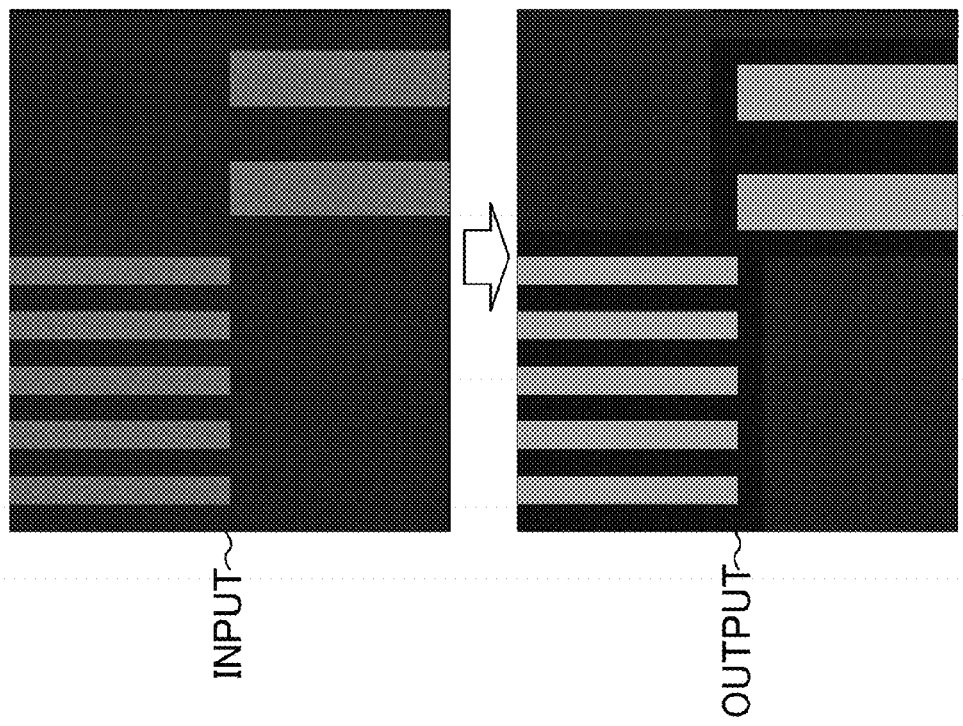

FIGS. 7A and 7B show examples of the effect of this embodiment, where FIG. 7A shows an example of the effect for an image high in resolution and FIG. 7B shows an example of the effect for an image low in resolution. As shown in FIG. 7B, when the resolution of the input image is low, the effect of the edge emphasis processing is intensified. As described above, in this embodiment, by determining the resolution of the input signal, the effect of the resolution enhancement processing can be changed according to the resolution of the input image.

The display device 62 has a display panel, etc. and displays the image VP subjected to the resolution enhancement processing.

The resolution enhancement processing by the resolution enhancement processing section 40 is not limited to the edge emphasis processing. For example, processing of performing pattern detection for the input image VI and replacing the input image with an appropriate image according to the detection result may be performed. When the input image VI is determined to be an image obtained by up-converting an image having a resolution equal to or lower than that of an SD image (e.g., when the correction coefficient CF is larger than 1), the resolution enhancement processing section 40 may generate an image larger in the number of grayscale levels than the input image VI and output the result.

The function blocks described above can be typically implemented by hardware. For example, the function blocks can be formed on a semiconductor substrate as part of an integrated circuit (IC). The IC as used herein includes a large-scale integrated circuit (LSI), an application-specific integrated circuit (ASIC), a gate array, a field programmable gate array (FPGA), etc. Alternatively, part or all of the function blocks can be implemented by software. For example, such a function block can be implemented by a program executed on a processor. In other words, the function blocks described above may be implemented by hardware, by software, or by an arbitrary combination of hardware and software.

As described above, according to the present disclosure, whether or not the input image is an image obtained by up-converting an image having a resolution equal to or less than a predetermined value, and whether or not it is a flat image, can be found at high speed and low cost. Therefore, the disclosure is useful as a resolution determination device, an image processing device, an image display apparatus, etc.

What is claimed is:

1. A resolution determination device, comprising:
   an edge intensity calculation section configured to calculate an edge intensity for each of a plurality of pixels included in an input image based on a difference between the luminance of the pixel and the luminance of a pixel adjoining the pixel; and
   a resolution determination section,
   wherein
   the resolution determination section includes
      a coring processing section configured to bring the edge intensity near to value 0 when the edge intensity is determined to be noise,
      an edge change point detection section configured to detect a pixel at which the adjoining edge intensities are different in sign,
      a first accumulation section configured to accumulate results of the edge change point detection section for a plurality of pixels, and
      a second accumulation section configured to accumulate pixels of which the accumulation value exceeds a parameter value input from outside the resolution determination section for one frame, and
   the resolution determination section determines whether or not the input image is an image obtained by up-converting an image having a resolution equal to or less than a predetermined value, and whether or not the input value is a flat image, based on the accumulation result, and outputs the determination result.

2. The resolution determination device of claim 1, wherein the resolution determination section further includes a correction coefficient generation section configured to generate a correction coefficient according to the accumulation result and output the correction coefficient as the determination result.

3. The resolution determination device of claim 2, wherein the resolution determination section further includes a filter configured to smooth the accumulation value in the time axis direction, and
the correction coefficient generation section generates the correction coefficient according to the accumulation value smoothed by the filter.

4. The resolution determination device of claim 3, wherein the correction coefficient generation section generates a plurality of correction coefficients according to the accumulation value.

5. An image processing device, comprising:
   the resolution determination device of claim 1; and
   a resolution enhancement processing section configured to perform resolution enhancement processing for the input image according to the determination result from the resolution determination section and output the result.

6. The image processing device of claim 5, wherein the resolution enhancement processing section includes a limiter configured to limit the luminance of an image subjected to the resolution enhancement processing to a value within a range determined based on the input image and output the result.

7. The image processing device of claim 6, wherein the resolution enhancement processing section performs resolution enhancement without performing the limitation by the limiter when the input image is determined to be an image obtained by up-converting an image having a resolution equal to or less than a predetermined value.

8. The image processing device of claim 7, wherein the resolution enhancement processing section performs resolution enhancement by performing the limitation by the limiter when the input image is determined to be a flat image.

9. An image display apparatus, comprising:

the image processing device of claim 5; and a display device configured to display an image subjected to the resolution enhancement processing by the image processing device.

* * * * *